US011151420B2

(12) United States Patent
Oishi et al.

(10) Patent No.: US 11,151,420 B2
(45) Date of Patent: Oct. 19, 2021

(54) DETERMINATION USING LEARNED MODEL

(71) Applicant: INTERNATIONAL BUSINESS MACHINES CORPORATION, Armonk, NY (US)

(72) Inventors: Yutaka Oishi, Kawasaki (JP); Chiaki Oishi, Yokohama (JP); Shuji Umehara, Kawasaki (JP); Takuya Goto, Kodaira (JP); Masaki Saitoh, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 101 days.

(21) Appl. No.: 16/194,507

(22) Filed: Nov. 19, 2018

(65) Prior Publication Data

US 2020/0160115 A1 May 21, 2020

(51) Int. Cl.
*G06K 9/62* (2006.01)
*G06K 9/46* (2006.01)
*G06T 7/00* (2017.01)

(52) U.S. Cl.
CPC ......... *G06K 9/6262* (2013.01); *G06K 9/4642* (2013.01); *G06T 7/0012* (2013.01); *G06T 2207/20081* (2013.01); *G06T 2207/30061* (2013.01); *G06T 2207/30096* (2013.01)

(58) Field of Classification Search
CPC .. G06K 9/6262; G06K 9/4642; G06K 9/6203; G06T 7/0012; G06T 2207/20081; G06T 2207/30061; G06T 2207/30096; G06T 2207/10132; G06T 7/73; G06T 7/0016; A61B 1/2676; A61B 2034/104; A61B 2034/2063; A61B 18/1815; A61B 2018/00577; A61B 5/055; A61B 6/502; A61B 8/0825; C12M 1/34; G16B 25/10; G16B 40/00; G01N 33/50; C12Q 1/68; G01R 33/5608
See application file for complete search history.

(56) References Cited

U.S. PATENT DOCUMENTS

| 9,208,405 B2 | 12/2015 | Dai et al. |
| 9,324,022 B2 | 4/2016 | Williams, Jr. et al. |
| 9,760,990 B2 | 9/2017 | Abedini et al. |
| 2009/0174729 A1* | 7/2009 | Matsumoto ............. G06T 15/08 345/619 |
| 2018/0085169 A1* | 3/2018 | Krimsky ............... A61B 1/2676 |

(Continued)

*Primary Examiner* — Jianxun Yang
(74) *Attorney, Agent, or Firm* — Alexis N. Hatzis

(57) ABSTRACT

A method, computer system, and a computer program product for digital image recognition determination using a learned model is provided. The present invention may include acquiring a first determination result by making a determination concerning first data, using a first learned model. The present invention may include selecting a partial region of the first data. The present invention may then include generating second data obtained by applying a first alteration process to the partial region. The present invention may also include acquiring a second determination result by making a determination concerning the second data, using a second learned model. The present invention may lastly include obtaining a final determination result based on the first determination result and the second determination result.

25 Claims, 8 Drawing Sheets

(56) References Cited

U.S. PATENT DOCUMENTS

| | | |
|---|---|---|
| 2018/0144466 A1 | 5/2018 | Hsieh et al. |
| 2019/0228257 A1* | 7/2019 | Karimabadi ............ A61B 5/055 |
| 2019/0267113 A1* | 8/2019 | Okanohara .............. C12M 1/34 |

* cited by examiner

| DETERMINATION RESULT | LEARNED MODEL a | LEARNED MODEL b | LEARNED MODEL c |
|---|---|---|---|
| IMAGE Ra | CANCER PRESENT | CANCER PRESENT | CANCER PRESENT |
| IMAGE Rb | NO CANCER | NO CANCER | NO CANCER |
| IMAGE Rc | NO CANCER | NO CANCER | NO CANCER |

FIG. 6

DETERMINATION USING LEARNED MODEL

BACKGROUND

The present invention relates generally to the field of computing, and more particularly to digital image recognition determination using a learned model.

Conventionally, various methods have been proposed for performing image recognition using a learned model. For example, Patent Documents 1 to 3, referenced below, include statements such as "the system may utilize multiple machine learning models ..." and "a plurality of images can be gathered ... to train ... a neural network to be deployed to automatically detect regions of interest in images." However, there are cases where the detection trend of a region of interest differs depending on the learned model, and this affects the accuracy of the determination.

Patent Document 1: U.S. Pat. No. 9,208,405 B2
Patent Document 2: U.S. Pat. No. 9,324,022 B2
Patent Document 3: US20180144466 A1

SUMMARY

According to one aspect of the present invention, provided is a computer-implemented method comprising acquiring a first determination result by making a determination concerning first data, using a first learned model; selecting a partial region of the first data; generating second data obtained by applying a first alteration process to only the partial region; acquiring a second determination result by making a determination concerning the second data, using a second learned model; and obtaining a final determination result based on the first determination result and the second determination result. In this way, in certain instances, the determination accuracy may be increased.

The partial region may be one of a region that is a target on which the determination is performed by the first learned model and a region that is not the target on which the determination is performed by the first learned model, among regions included in the first data. In this way, in certain instances, the determination accuracy may be increased.

Selecting the partial region may include acquiring the region that is a target on which the determination is performed by the first learned model, among the regions included in the first data, using back-propagation. In this case, the region to be the target for the determination performed by the first learning model can be precisely obtained.

The first alteration process may be a masking process. In this case, it is possible to limit the region to be the target for the determination performed by the second learning model, to be outside the selection region.

According to another aspect of the present invention, provided is an apparatus comprising a processor or programmable circuitry; and one or more computer readable mediums collectively including instructions that, in response to be executed by the processor or the programmable circuitry, cause the processor or the programmable circuitry to acquire a first determination result by making a determination concerning first data, using a first learned model; select a partial region of the first data; generate second data obtained by applying a first alteration process to only the partial region; acquire a second determination result by making a determination concerning the second data, using a second learned model; and obtain a final determination result based on the first determination result and the second determination result. In this way, in certain instances, the determination accuracy may be increased.

According to yet another aspect of the present invention, provided is an apparatus comprising a first result acquiring section that acquires a first determination result by making a determination concerning first data, using a first learned model; a selecting section that selects a partial region of the first data; a generating section that generates second data obtained by applying a first alteration process to only the partial region; a second result acquiring section that acquires a second determination result by making a determination concerning the second data, using a second learned model; and a final result acquiring section that obtains a final determination result based on the first determination result and the second determination result. In this way, in certain instances, the determination accuracy may be increased.

According to yet another aspect of the present invention, provided is a computer program product including one or more computer readable storage mediums collectively storing program instructions that are executable by a processor or programmable circuitry to cause the processor or the programmable circuitry to perform operations comprising acquiring a first determination result by making a determination concerning first data, using a first learned model; selecting a partial region of the first data; generating second data obtained by applying a first alteration process to only the partial region; acquiring a second determination result by making a determination concerning the second data, using a second learned model; and obtaining a final determination result based on the first determination result and the second determination result. In this way, in certain instances, the determination accuracy may be increased.

The summary clause does not necessarily describe all necessary features of the embodiments of the present invention. The present invention may also be a sub-combination of one or more features described above.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 6 is a table of second determination results acquired from second data, obtained by applying the masking process to the non-target regions in FIG. 5, using three second learned models 12a, 12b, and 12c, according to at least one embodiment;

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
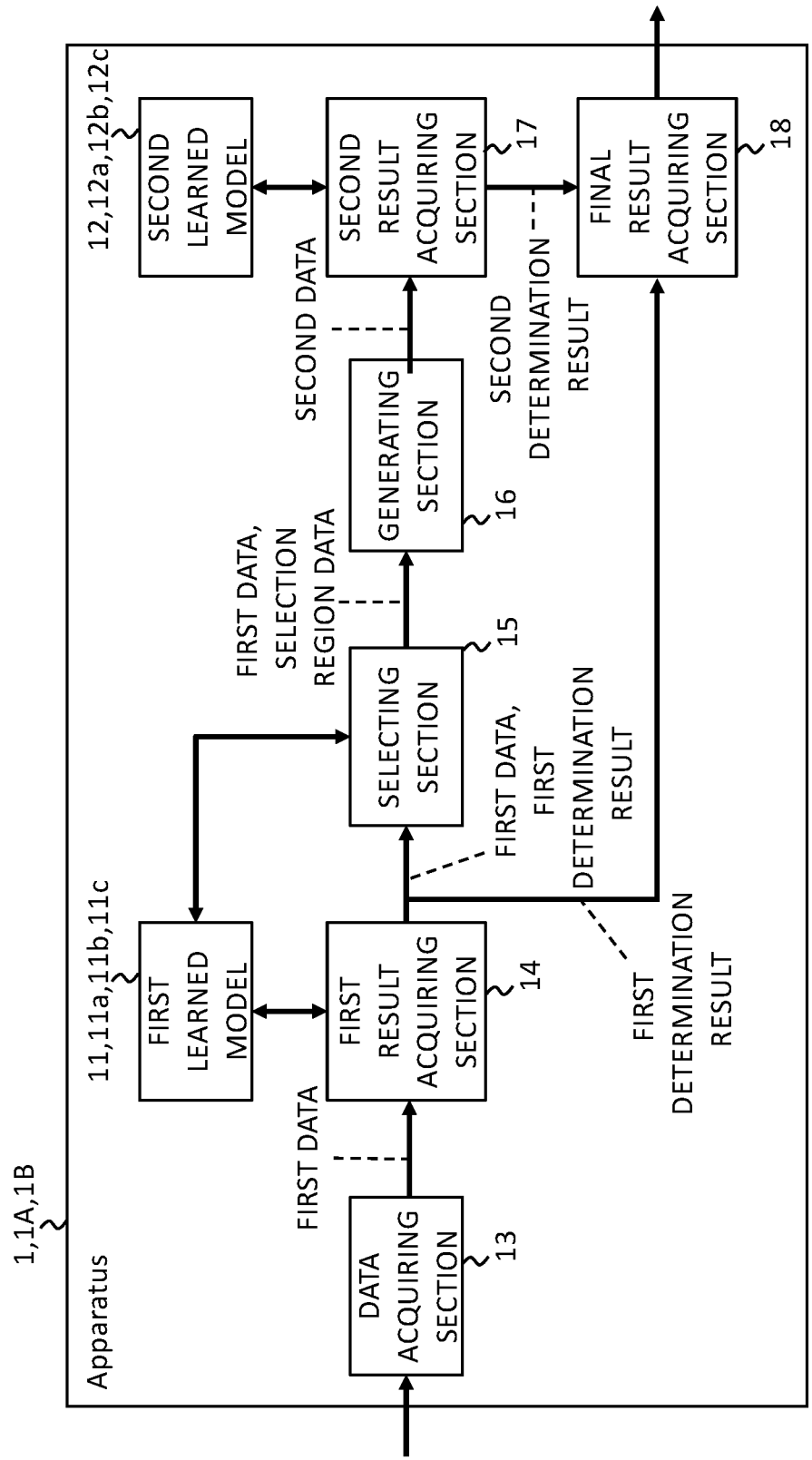
FIG. 1 is a block diagram 1 of the digital image recognition determination using a learned model according to at least one embodiment.

Referring now to FIG. 1, a block diagram 1 of the digital image recognition determination using a learned model according to at least one embodiment is depicted. A learned model may be a machine learning model (e.g., a trained model) which may learn from a set of training data, and which may make predictions concerning a set of new data. The apparatus 1 performs a determination using one or more learned models. According to at least one embodiment of the present invention, the apparatus 1 determines whether or not there is cancer tissue, based on image data of a lung portion of a living organism (e.g., a human body). The apparatus 1 may include one or more first learned models 11, one or more second learned models 12, a data acquiring section 13, a first result acquiring section 14, a selecting section 15, a generating section 16, a second result acquiring section 17, and a final result acquiring section 18.

The one or more first learned models 11 and one or more second learned models 12 may each output determination result data concerning whether there is cancer tissue within an image represented by image data, in response to having this image data input thereto. Each first learned model 11 and each second learned model 12 may detect cancer tissue by performing image recognition.

Each first learned model 11 and each second learned model 12 may be generated by performing a learning process (e.g., deep learning) using learning data that includes image data of a lung portion and diagnosis result data concerning whether cancer tissue is present. The diagnosis result data may be generated according to whether cancer tissue is confirmed using open chest surgery.

The number of one or more first learned models 11 and the number of one or more second learned models 12 may be, but is not required to be, the same. At least one of the one or more first learned models 11 may be the same as any one of the one or more second learned models 12. According to at least one embodiment of the present invention, a single learned model 11 (e.g., the first learned model 11a) and three second learned models 12 (e.g., the second learned models 12a, 12b, and 12c) are implemented in the apparatus 1, and the first learned model 11a is the same as the second learned model 12a. The first learned model 11 and the second learned models 12 may be stored in a server outside of the apparatus 1.

The data acquiring section 13 may acquire first data, which is a determination target. According to at least one embodiment of the present invention, the first data is image data of the lung portion. The data acquiring section 13 may supply the first result acquiring section 14 with the acquired first data.

The first result acquiring section 14 acquires a first determination result by making a determination concerning the first data using the one or more first learned models 11. According to at least one embodiment of the present invention, the first result acquiring section 14 acquires a determination result concerning whether there is cancer tissue in the lung portion shown by the first data, using a single first learned model 11a. The first result acquiring section 14 supplies the selecting section 15 with the determination result (e.g., a first determination result) and the first data. Furthermore, the first result acquiring section 14 supplies the final result acquiring section 18 with the first determination result.

The selecting section 15 selects a partial region (e.g., a selection region) of the first data. The selection region is one of a region that is a target (e.g., a target region) and a region that is not a target (e.g., a non-target region) for which the first learned model 11 is to perform a determination, among the regions included in the first data. The target region may be a region that is to be focused on in the determination performed by the first learned model 11 or a region serving as evidence of the determination, and can be referred to as a region of interest. The non-target region may be the entire region that is different from the target region within the first data. The selecting section 15 supplies the generating section 16 with the first data and selection region data that indicates the selection region.

The generating section 16 generates second data, obtained by applying a first alteration process on only the selection region of the first data. For example, the generating section 16 may perform the first alteration process on only the selection region indicated by the selection region data, within the image included in the first data. The generating section 16 supplies the second data to the second result acquiring section 17.

The second result acquiring section 17 acquires a second determination result by making a determination concerning the second data, using the one or more second learned models 12. According to at least one embodiment of the present invention, the second result acquiring section 17 acquires a determination result concerning whether there is cancer tissue in the lung portion shown by the second data, from each of the second learned models 12a, 12b, and 12c, using the three second learned models 12a, 12b, and 12c. The second result acquiring section 17 supplies the final result acquiring section 18 with the determination results (e.g., second determination results).

The final result acquiring section 18 acquires a final determination result, based on the first determination result and the second determination result. According to at least one embodiment of the present invention, the final result acquiring section 18 acquires information about whether there is cancer tissue in the image of the lung portion, as the final determination result. The final result acquiring section 18 may output the acquired final determination result to an external apparatus (e.g., a display apparatus).

According to the apparatus 1 described above, the final determination result is acquired based on the first determination result for the first data and the second determination result for the second data obtained by applying the first alteration process to only the selection region of the first data. Accordingly, it is possible to obtain a second determination result in which the detection trend of the target region by the second learned model 12 has been weakened, and therefore it is possible to increase the accuracy of the final determination result.

Furthermore, since the target region or non-target region among the regions included in the first data is set to be the selection target in the determination of the first learned model 11, it is possible to limit the target region in the determinations of the second learned models 12 to be within the target region or the non-target region in the determination of the first learned model 11, by generating the second data obtained by applying the first alteration process to only this selection region. Accordingly, in a case where the first determination result and the second determination result are obtained from the same region, the accuracy of the final determination result is further increased by performing determinations at two levels. Furthermore, in a case where the first determination result and the second determination result are acquired from separate regions, it is possible to further increase the accuracy of the final determination result by performing the determination using a wider region as the target.

Since the final determination result is acquired by acquiring a second determination result from each of the plurality of second learned models 12a, 12b, and 12c, it is possible to further increase the accuracy of the final determination result.

Furthermore, since at least one of the first learned models 11 is the same as a second learned model 12, the cost can be reduced compared to a case in which separate learned models are used.

Figure 2:
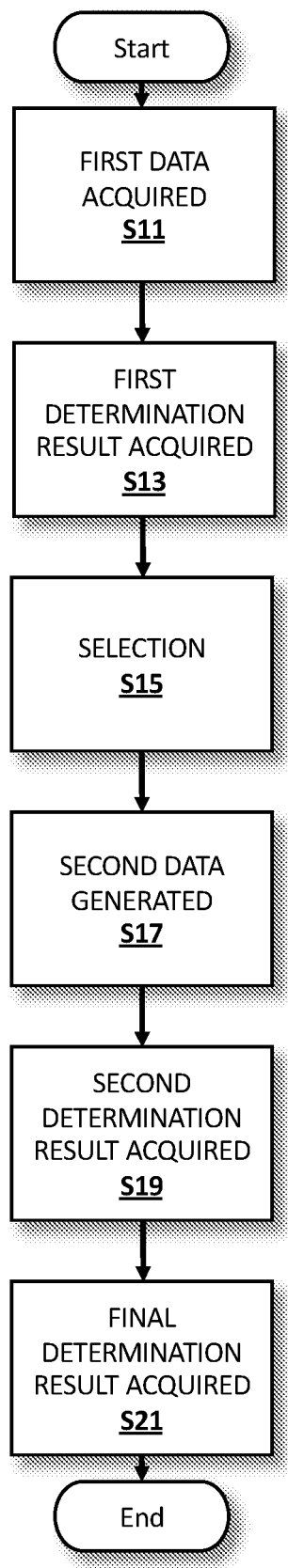
FIG. 2 is an operational flowchart illustrating a process for digital image recognition determination using a learned model according to at least one embodiment.

Referring now to FIG. 2, an operational flowchart illustrating a process for digital image recognition determination using a learned model according to at least one embodiment is depicted. As described previously, a learned model may be a machine learning model (e.g., a trained model) which may learn from a set of training data, and which may make predictions concerning a set of new data. The apparatus 1 determines whether there is cancer tissue in an image of the lung portion, by performing the process steps S11 to S21.

At step S11, the data acquiring section 13 acquires the first data indicating the image of the lung portion. The first data may be a CT image, or may be an X-ray image.

At step S13, the first result acquiring section 14 acquires the first determination result by making a determination concerning the first data using the first learned model 11. For example, the first result acquiring section 14 inputs the first data into the first learned model 11 and acquires the determination result output from the first learned model 11.

At step S15, the selecting section 15 selects a partial region of the first data as the selection region. For example, the selecting section 15 acquires the target region for the determination of the first learned model 11 among the regions included in the first data, using back-propagation, and sets the non-target region, which is obtained by excluding the target region from the first data, as the selection region. As an example, the selecting section 15 may back-propagate the error in the output layer (final layer) of the first learned model 11 to the input layer side, obtain the relationship between the error in the output layer and the error of each region in the image of the first data, and set the region that affects the determination of the output layer, among each region in the image, to be the target region. In this way, the target region for the determination of the first learned model 11 is obtained using back-propagation, and therefore the target region is accurately obtained.

At step S17, the generating section 16 generates the second data obtained by applying the first alteration process to only the selection region. According to at least one embodiment of the present invention, the first alteration process is a masking process. In this way, the second data is image data of the target region for the determination of the first learned model 11, among the regions included in the first data. When generating the second data, the generating section 16 may apply a second alteration process (e.g., an enhancement process), which is different from the first alteration process, to another region (e.g., the target region of the determination of the first learned model 11) that is different from the selection region, among the regions included in the first data.

At step S19, the second result acquiring section 17 acquires the second determination result by making a determination about the second data using the second learned model 12. For example, the second result acquiring section 17 inputs the second data into the second learned model 12 and acquires the determination result output from the second learned model 12. The second result acquiring section 17 may acquire the target region of the determination of the second learned model 12, among the region included in the second data, using back-propagation.

At step S21, the final result acquiring section 18 acquires the final determination result based on the first determination result and the second determination result. For example, the final result acquiring section 18 may include each of the first determination result and the second determination result as a possible determination result in the final determination result. Instead of this, the final result acquiring section 18 may set the majority determination result among the first determination result and the one or more second determination results, or the majority determination result among a plurality of second determination results, to be the final determination result. The final result acquiring section 18 may acquire from the selecting section 15 or the second result acquiring section 17, along with each first and/or second determination result, a target region of the corresponding determination, and include these target regions in the final determination result.

According to the operation described above, since the second data is generated by applying the masking process to the selection region (e.g., the non-target region of the determination of the first learned model 11), the target region of the determination of the second learned model 12 can be limited to be within a region (e.g., the target region of the determination of the first learned model 11) differing from the selection region.

Furthermore, since the second data is generated by applying the second alteration process to another region differing from the selection region, it is possible to reliably limit the target region of the determination of the second learned model 12.

Figure 3:
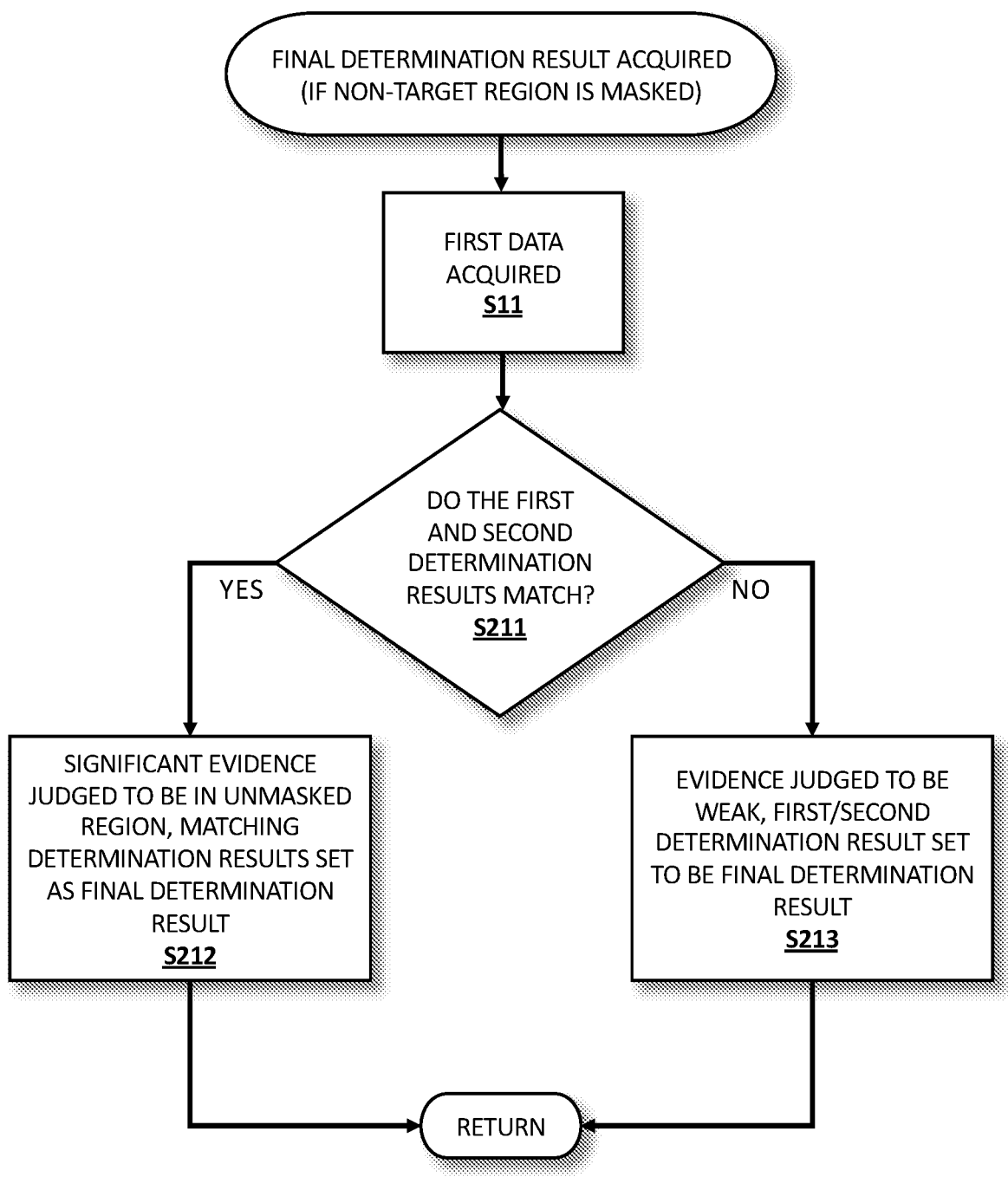
FIG. 3 is an operational flowchart illustrating a process for acquiring a final determination result, the second determination result being obtained by masking the selection region, which is the non-target region, according to at least one embodiment.

Referring now to FIG. 3, an operational flowchart illustrating a process for acquiring a final determination result, the second determination result being obtained by masking the selection region, which is the non-target region, according to at least one embodiment is depicted. The final result acquiring section 18 acquires the final determination result by performing the process steps S211 to S213.

At step S211, the final result acquiring section 18 judges whether the first determination result obtained from the first learned model 11 and the second determination result obtained from the second learned model 12 match. In this way, a judgment is made as to whether the determination results match in a case where the determinations are made with the same region being the target for both the first learned model 11 and the second learned model 12. In a case where there are a plurality of first learned models 11 and/or second learned models 12, the final result acquiring section 18 may judge whether all of the determination results match. The final result acquiring section 18 moves the process to step S212 if the judgment result is affirmative, and moves the process to step S213 if the judgment result is negative.

At step S212, the final result acquiring section 18 sets a single determination result indicated by the first and second determination results to be the final determination result, and the process of step S21 is ended. In a case where the first and second determination results indicate that there is cancer tissue, the final result acquiring section 18 may include, in the final determination result, information indicating that there is significant evidence showing the presence of cancer tissue in the unmasked non-selection region (i.e. the target region of the determinations of the first learned model 11 and second learned model 12). In a case where the first and second determination results indicate that there is no cancer tissue, the final determination result may include information indicating that there is significant evidence showing that cancer tissue is not present in the unmasked non-selection region.

At step S213, the final result acquiring section 18 sets the first and/or second determination result to be the final determination result, and the process of step S21 is ended. As an example, the final result acquiring section 18 may include each of the first and second determination results as possible determination results in the final determination result. Furthermore, the final result acquiring section 18 may include the weakness of the evidence of each determination in the final determination result.

The apparatus 1 according to the present modification (e.g., the apparatus 1A) includes a plurality of the first learned models 11.

Figure 4:
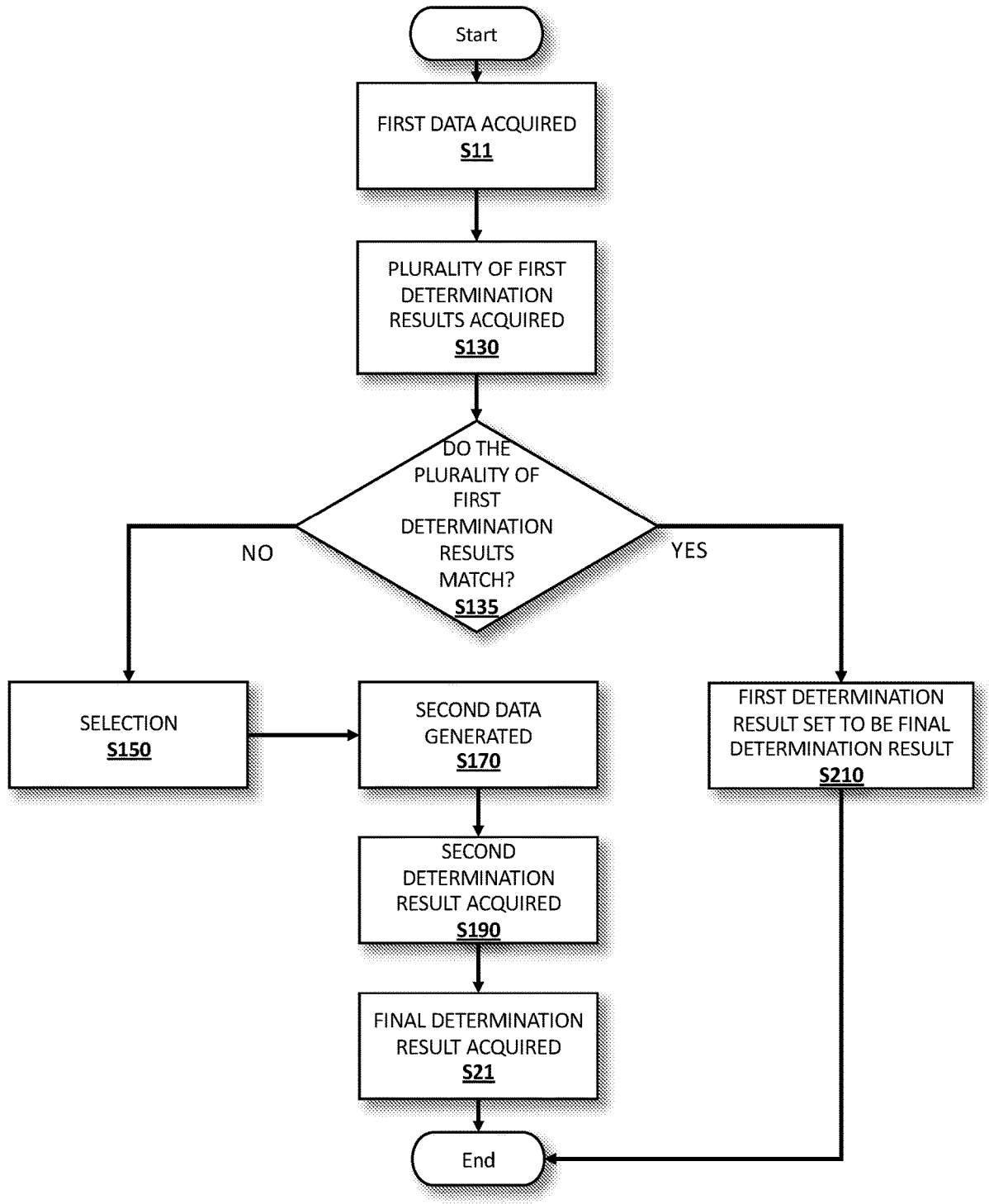
FIG. 4 is an operational flowchart illustrating a process for the operation of apparatus 1A according to at least one embodiment.

Referring now to FIG. 4, an operational flowchart illustrating a process for the operation of apparatus 1A according to at least one embodiment is depicted. In the operation according to the present modification, operations that are substantially the same as operation shown in FIG. 2 are given the same reference numerals, and descriptions thereof are omitted.

At step S130, the first result acquiring section 14 acquires the first determination result from each of the plurality of first learned models 11. At step S135, the first result acquiring section 14 judges whether the plurality of first determination results match each other. If the judgment result is affirmative the apparatus 1 moves the process to step S210, and if the judgment result is negative, the apparatus 1 moves the process to step S150.

At step S210, the final result acquiring section 18 sets the first determination results that match each other, obtained respectively from the plurality of first learned models 11, to be the final determination result. The final result acquiring section 18 may acquire the target region for each determination along with the first determination results, and include these target regions in the final determination result.

At step S150, the selecting section 15 may set each of the non-target regions of the determinations of the plurality of learned models 11 to be a selection region.

At step S170, the generating section 16 may generate a plurality of pieces of second data obtained by applying the first alteration process (e.g., the masking process) to each selection area in the first data. For example, in a case where there are N selection regions, the generating section 16 may prepare N pieces of first data and generate N pieces of second data by applying the first alteration process to a single selection region in each piece of first data.

At S190, the second result acquiring section 17 may acquire the second determination result by performing the determination for each of a plurality of pieces of second data, using the second learned model 12. For example, if a plurality of second learned models 12 are being used, the second result acquiring section 17 may acquire a second determination result for each of the N pieces of second data using each second learned model 12.

According to at least one embodiment of the present invention, in a case where the plurality of first determination results match each other, these first determination results are set to be the final determination result, and therefore the process steps S15 to S19 are not performed. Accordingly, it is possible to simplify the process for acquiring the final determination result.

Figure 5:
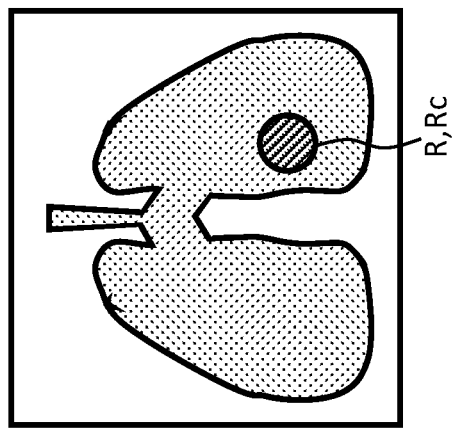
FIG. 5 is a block diagram of the target region of the first determination result of each of three first learned models 11 according to at least one embodiment.
Figure 5:
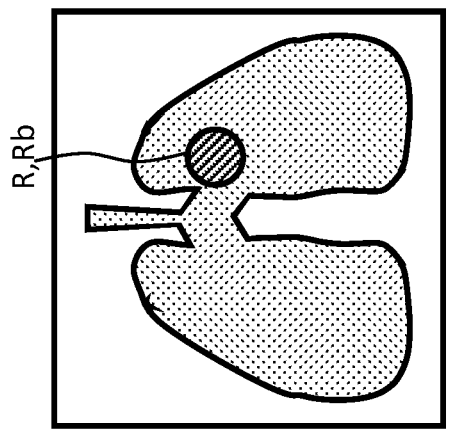
Figure 5:
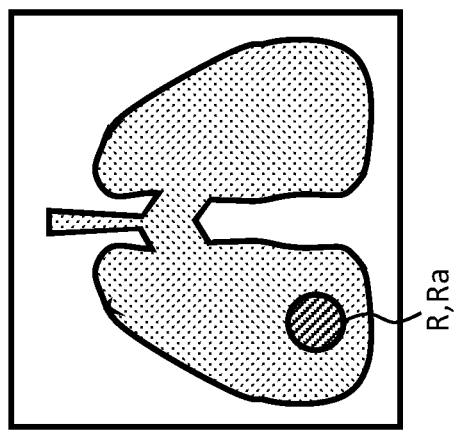

Referring now to FIG. 5, a block diagram of the target region of the first determination result of each of three first learned models (e.g., learned models 11a, 11b, and 11c) according to at least one embodiment is depicted. As described previously, a learned model may be a machine learning model (e.g., a trained model) which may learn from a set of training data, and which may make predictions concerning a set of new data. The shaded portions in the frames in the drawing indicate lung portions and bronchial portions of a human body, and the regions R shaded with diagonal lines indicate target regions.

The first determination result obtained using the first learned model 11a has the diagonally shaded region Ra as the target region and indicates that there is cancer tissue in the image. The first determination result obtained using the learned model 11b has the diagonally shaded region Rb as the target region and indicates that there is no cancer tissue in the image. The first determination result obtained using the learned model 11c has the diagonally shaded region Rc as the target region and indicates that there is no cancer tissue in the image. In this way, even in a case where the same first data is used, if the first learned models 11a, 11b, and 11c are different from each other it is possible to make the target regions and/or first determination results different from each other.

Referring now to FIG. 6, a table of second determination results acquired from second data, obtained by applying the masking process to the non-target regions in FIG. 5, using three second learned models 12a, 12b, and 12c, according to at least one embodiment is depicted. In the drawing, "image Ra" is the second data obtained when only the diagonally shaded region Ra of FIG. 5 remains, "image Rb" is the second data obtained when only the diagonally shaded region Rb remains, and "image Rc" is the second data obtained when only the diagonally shaded region Rc remains. Furthermore, in the drawing, "learned model a" is the first learned model 11a and the second learned model 12a, "learned model b" is the first learned model 11b and the second learned model 12b, and "learned model c" is the first learned model 11c and the second learned model 12c.

For "image Ra," it is determined that there is cancer tissue according to each of the second learned models 12a, 12b, and 12c. Furthermore, for "image Rb" and "image Rc," it is determined that there is no cancer tissue according to each of the second learned models 12a, 12b, and 12c. In this case, the final result acquiring section 18 may set the final determination result to be that there is cancer tissue in the diagonally shaded region Ra but there is no cancer tissue in the other regions. The fact that that there is no cancer tissue in the image of the first data according to the first learned models 11b and 11c is believed to be because cancer tissue in the diagonally shaded region Ra was overlooked, as a result of regions where there is no cancer tissue (e.g., the diagonally shaded regions Rb and Rc) being set as the target regions.

The selecting section 15 of the apparatus 1 of the present modification (e.g., the apparatus 1B) sets a target region for the determination of the first learned model 11, among the regions included in the first data, to be the selection region.

Figure 7:
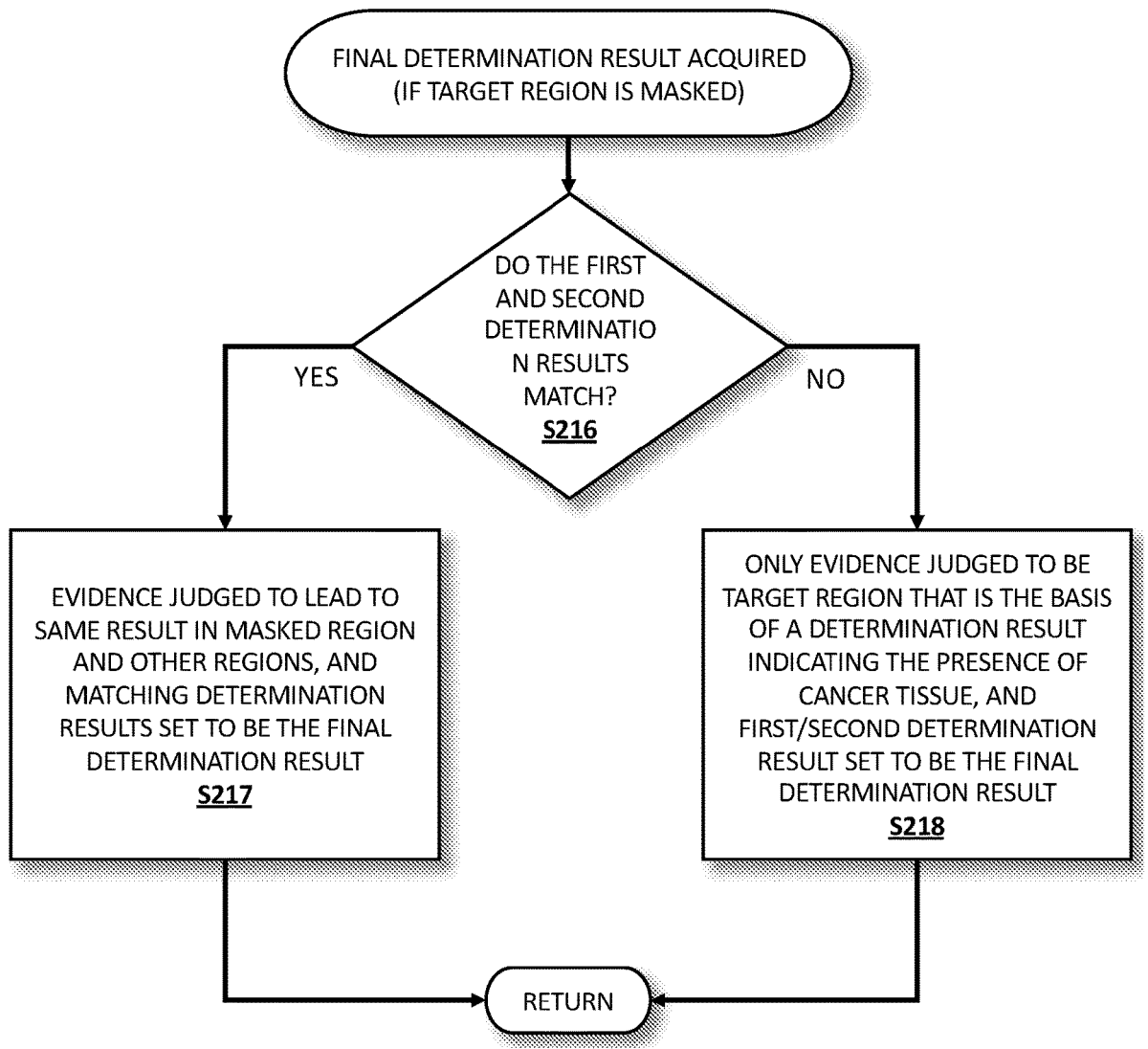
FIG. 7 is an operational flowchart illustrating a process for step S21 in a case where the second determination result is obtained by masking the selection region, which is the target region, according to at least one embodiment.

Referring now to FIG. 7, an operational flowchart illustrating a process for step S21 in a case where the second determination result is obtained by masking the selection region, which is the target region, according to at least one embodiment is depicted. The final result acquiring section 18 acquires the final determination result by performing the process of steps S216 to S218.

At step S216, the final result acquiring section 18 judges whether the first determination result obtained from the first learned model 11 matches the second determination result obtained from the second learned model 12. In this way, the judgment concerning whether the results match is made in a case where the determinations made by the first learned model 11 and the second learned model 12 use different regions as the targets.

In a case where there is a plurality of first learned models 11 and/or second learned models 12, the final result acquiring section 18 may judge whether all of the determination results match. The final result acquiring section 18 moves the process to step S217 if the judgment result is affirmative, and moves the process to step S218 if the judgment result is negative.

At step S217, the final result acquiring section 18 sets the final determination result to be a single determination result indicated by the first and second determination results, and ends the process of step S21. If the first and second determination results each indicate that there is cancer tissue, the final result acquiring section 18 may include, in the final determination result, there is evidence showing the presence of cancer tissue in the masked selection region (i.e. the target region of the determination of the first learned model 11) and in a region other than this selection region. If the first and second determination results each indicate that there is no cancer tissue, the final result acquiring section 18 may include, in the final determination result, there is evidence showing that cancer tissue is not present in the masked selection region and in the region other than this selection region.

At step S218, the final result acquiring section 18 sets the final determination result to be the first and/or second determination result, and ends the process of step S21. In the present modification, the final result acquiring section 18 may set the final determination result to be that there is cancer tissue. Alternatively, the final result acquiring section 18 may include, in the final determination result, information indicating that the target region serving as the basis for the determination result that cancer tissue is not present is the only evidence.

In the embodiments described above, at least one first learned model 11 is described as being the same as the second learned model 12, but each first learned model 11 may be different from the second learned model 12. In this case, unlike a case in which the same learned models are used, it is possible to acquire the first determination result and the second determination result according to different viewpoints.

Furthermore, the generating section 16 is described as generating the second data by applying the masking process to the selectin region, but the generating section 16 may apply another process instead. For example, the generating section 16 may apply an enhancement process to the selection region. In this case, the target region for the determination of the second learned model 12 can be limited to the selection region. Furthermore, the generating section 16 may perform a process to change the resolution or color tone of the selection region.

The selecting section 15 is described as selecting a target region or non-target region for the determination within the first data as the selection region, but the selecting section 15 may instead select the selection region randomly from the first data. In this case, it is possible to randomly limit the target region for the determination of the second learned model 12. Accordingly, since the second determination results are obtained from a wider target region by using a plurality of second learned models 12, for example, it is possible to further increase the accuracy of the final determination result.

The first result acquiring section 14 and the second result acquiring section 17 are described as acquiring determination results indicating the presence or lack of cancer tissue in the image, as the first determination result and the second determination result, but determination results indicating the presence or lack of another target object in the image may be acquired. For example, the determination results may show another malignant tumor in an X-ray image or CT image, or may indicate whether there is a lesion in a microscopic image of tissue collected through a biopsy. Furthermore, the determination results may indicate the presence or lack of a face portion of a human body in a portrait image or landscape image. In these cases, the presence or lack of the target object in the image can be acquired as the final determination result.

The first data and second data are described as being image data, but may alternatively be audio data. In this case, the selecting section 15 may select a partial time region or frequency region of the first data that is audio data. Furthermore, each first learned model 11 and each second learned model 12 may perform audio recognition, and the first determination results and second determination results may indicate the presence or lack of a prescribed sound or keyword in the audio data.

The final result acquiring section 18 is described as outputting the final determination result, but the final determination result may instead be used for reinforcement of the first learned model 11 and/or second learned model 12. Furthermore, in a case where open chest surgery is actually being performed, the first learned model 11 and/or second learned model 12 may be reinforced according to whether cancer tissue is confirmed by this surgery.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

Figure 8:
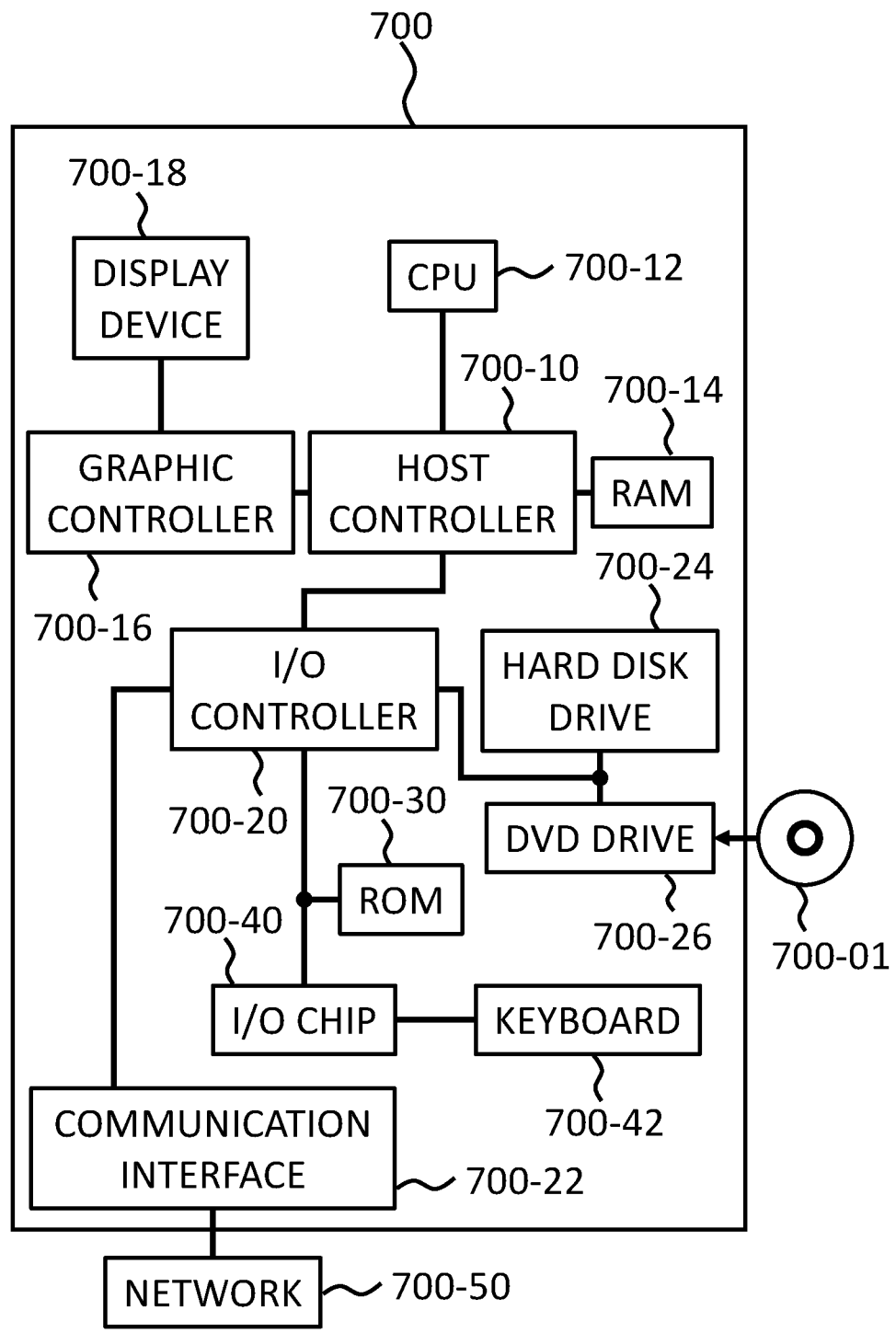
FIG. 8 is a block diagram of internal and external components of a computer according to at least one embodiment.

Referring now to FIG. 8, a block diagram of internal and external components of a computer according to at least one embodiment is depicted. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700.

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

As has been described above with respect to embodiments of the present invention, it may be possible to increase the accuracy of the digital image recognition determination using a learned model.

What is claimed is:

1. A computer-implemented method for digital image recognition determination using a learned model, the method comprising:

acquiring a first determination result by making a determination concerning first data, using a first learned model, wherein the first learned model is generated using learning data that includes image data of a lung portion and diagnosis result data concerning whether cancer tissue is present in the first data, and wherein the first determination result is depicted as a shaded portion on the digital image;

selecting a partial region of the first data;

generating second data obtained by applying a first alteration process to the partial region, wherein the second data is separate from the image data of the partial region for the determination of the first learned model;

acquiring a second determination result by making a determination concerning the second data, using a second learned model; and obtaining a final determination result based on and including the first determination result and the second determination result, and a plurality of evidence indicating whether cancer tissue is present.

2. The computer-implemented method of claim 1, wherein the partial region is selected from the group consisting of a region that is a target on which the determination is performed by the first learned model, a region that is not the target on which the determination is performed by the first learned model, and a region included in the first data.

3. The computer-implemented method of claim 2, wherein selecting the partial region of the first data further comprises:

using back-propagation to acquire the region that is a target on which the determination is performed by the first learned model.

4. The computer-implemented method of claim 1, wherein the partial region is a region selected randomly from the first data.

5. The computer-implemented method of claim 1, wherein the first alteration process comprises applying a masking process to each of at least one selection area in the partial region, and wherein a target on which the determination is performed by the second learned model is limited to a region differing from the partial region.

6. The computer-implemented method of claim 1, wherein the first alteration process comprises an enhancement process.

7. The computer-implemented method of claim 1, wherein generating second data obtained by applying the first alteration process to the partial region further comprises:

applying a second alteration process, which is different from the first alteration process, on a second region of the first data that is different from the partial region.

8. The computer-implemented method of claim 1, wherein the first data and the second data comprise image data.

9. The computer-implemented method of claim 8, wherein the first determination result and the second determination result indicate a presence or absence of a target object in an image.

10. The computer-implemented method of claim 9, wherein the first data and the second data are image data of a lung portion, and the target object is cancer tissue.

11. The computer-implemented method of claim 1, further comprising:

acquiring the first determination result from a plurality of the first learned models, using the plurality of first learned models; and setting the first determination result to be the final determination result, in a case where the first determination results acquired from the plurality of first learned models match.

12. The computer-implemented method of claim 1, wherein acquiring the second determination result by making the determination concerning the second data, using the second learned model, further comprises:

acquiring the second determination result from a plurality of second learned models, using the plurality of second learned models.

13. The computer-implemented method of claim 1, wherein the first learned model and the second learned model are the same.

14. The computer-implemented method of claim 1, wherein the first learned model and the second learned model are different.

15. A computer system for digital image recognition determination using a learned model, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

acquiring a first determination result by making a determination concerning first data, using a first learned model, wherein the first learned model is generated using learning data that includes image data of a lung portion and diagnosis result data concerning whether cancer tissue is present in the first data, and wherein the first determination result is depicted as a shaded portion on the digital image;

selecting a partial region of the first data;

generating second data obtained by applying a first alteration process to the partial region, wherein the second data is separate from the image data of the partial region for the determination of the first learned model;

acquiring a second determination result by making a determination concerning the second data, using a second learned model; and obtaining a final determination result based on and including the first determination result and the second determination result, and a plurality of evidence indicating whether cancer tissue is present.

16. The computer system of claim 15, wherein the partial region is selected from the group consisting of a region that is a target on which the determination is performed by the first learned model, a region that is not the target on which the determination is performed by the first learned model, and a region included in the first data.

17. The computer system of claim 16, wherein selecting the partial region of the first data further comprises:

using back-propagation to acquire the region that is a target on which the determination is performed by the first learned model.

18. The computer system of claim 15, wherein the first alteration process comprises applying a masking process to the partial region, and wherein a target on which the determination is performed by the second learned model is limited to a region differing from the partial region.

19. The computer system of claim 15, wherein the first data and the second data are image data.

20. A computer system for digital image recognition determination using a learned model, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

acquiring a first determination result by making a determination concerning first data, using a first learned model, wherein the first learned model is generated using learning data that includes image data of a lung portion and diagnosis result data concerning whether cancer tissue is present in the first data, and wherein the first determination result is depicted as a shaded portion on the digital image;

selecting a partial region of the first data;

generating second data obtained by applying a first alteration process to the partial region, wherein the second data is separate from the image data of the partial region for the determination of the first learned model;

acquiring a second determination result by making a determination concerning the second data, using a second learned model; and obtaining a final determination result based on the first determination result and the second determination result, and a plurality of evidence indicating whether cancer tissue is present, wherein the final determination result is that the first determination result and the second determination result match.

21. The computer system of claim 20, wherein obtaining the final determination result based on the first determination result and the second determination result further comprises:

resolving that there is a plurality of evidence in an unmasked region.

22. The computer system of claim 20, wherein selecting a partial region of the first data further comprises:

using back-propagation to acquire a region that is a target on which the determination is performed by the first learned model, among the regions included in the first data.

23. The computer system of claim 20, wherein the first alteration process comprises applying a masking process to the partial region, and wherein a target on which the determination is performed by the second learned model is limited to a region differing from the partial region.

24. The computer system of claim 20, wherein the first data and the second data are image data.

25. A computer program product for digital image recognition determination using a learned model, comprising:

one or more non-transitory computer-readable storage media and program instructions stored on at least one of the one or more tangible storage media, the program instructions executable by a processor to cause the processor to perform a method comprising:

acquiring a first determination result by making a determination concerning first data, using a first learned model, wherein the first learned model is generated using learning data that includes image data of a lung portion and diagnosis result data concerning whether cancer tissue is present in the first data, and wherein the first determination result is depicted as a shaded portion on the digital image;

selecting a partial region of the first data;

generating second data obtained by applying a first alteration processes to the partial region, wherein the second data is separate from the image data of the partial region for the determination of the first learned models;

acquiring a second determination result by making a determination concerning the second data, using a second learned model; and obtaining a final determination result based on and including the first determination result and the second determination result, and a plurality of evidence indicating whether cancer tissue is present.

* * * * *